(12) United States Patent
Vogel et al.

(10) Patent No.: US 9,868,648 B2
(45) Date of Patent: Jan. 16, 2018

(54) PASSIVE CHEMICAL DOSING AND MIXING APPARATUS AND METHOD

(71) Applicants: Jason Robert Vogel, Stillwater, OK (US); Daniel Eugene Storm, Stillwater, OK (US); Billy J. Barfield, Stillwater, OK (US); Wayne Ray Kiner, Stillwater, OK (US); Karl Michael Garbrecht, Yukon, OK (US)

(72) Inventors: Jason Robert Vogel, Stillwater, OK (US); Daniel Eugene Storm, Stillwater, OK (US); Billy J. Barfield, Stillwater, OK (US); Wayne Ray Kiner, Stillwater, OK (US); Karl Michael Garbrecht, Yukon, OK (US)

( * ) Notice: Subject to any disclaimer, the term of this patent is extended or adjusted under 35 U.S.C. 154(b) by 960 days.

(21) Appl. No.: 13/902,762

(22) Filed: May 24, 2013

(65) Prior Publication Data

US 2014/0014591 A1    Jan. 16, 2014

Related U.S. Application Data

(60) Provisional application No. 61/651,419, filed on May 24, 2012.

(51) Int. Cl.
*C02F 1/00* (2006.01)
*C02F 1/52* (2006.01)
(Continued)

(52) U.S. Cl.
CPC .............. *C02F 1/00* (2013.01); *B01F 5/0473* (2013.01); *B01F 5/0483* (2013.01);
(Continued)

(58) Field of Classification Search
CPC .......... C02F 1/00; C02F 1/5281; C02F 1/686; C02F 1/008; C02F 1/52; C02F 1/463;
(Continued)

(56) References Cited

U.S. PATENT DOCUMENTS 1,496,678 A    6/1924  Rutter
4,351,720 A *  9/1982  Bailes ..................... C02F 1/686
                                                          210/101
(Continued)

OTHER PUBLICATIONS

"Passive Chemical Dosing Apparatus for Construction Site Stormwater Turbidity Reduction", A Master of Science Thesis by Garbrecht, Karl M. , Oklahoma State University submitted Dec. 2011.
(Continued)

*Primary Examiner* — Robert Clemente
*Assistant Examiner* — Akash Varma
(74) *Attorney, Agent, or Firm* — Paul A. Bell

(57) ABSTRACT

This disclosure is directed to the regulated injection of a chemical(s), solution(s) or material(s) hereafter referred to as chemicals into stormwater runoff, other surface waters or other fluid streams to promote the removal of a pollutant(s) or to alter the properties of the water. Specifically, and depending upon the types of chemicals injected, the physical, chemical and/or biological properties of the water can be altered. The invention provides a passive system to alter stormwater runoff or other surfaces. The system may be deployed at a remote site, such as a construction site, and implemented with minimal or zero external power requirements.

19 Claims, 9 Drawing Sheets

(51) Int. Cl.
*C02F 1/68* (2006.01)
*B01F 5/04* (2006.01)
*B01F 5/06* (2006.01)
*C02F 103/00* (2006.01)

(52) U.S. Cl.
CPC .......... *B01F 5/0619* (2013.01); *B01F 5/0652* (2013.01); *C02F 1/5281* (2013.01); *C02F 1/686* (2013.01); *B01F 2005/0636* (2013.01); *C02F 1/008* (2013.01); *C02F 2103/001* (2013.01); *C02F 2103/007* (2013.01); *C02F 2209/42* (2013.01); *C02F 2301/024* (2013.01); *Y02W 10/37* (2015.05)

(58) Field of Classification Search
CPC ........ C02F 1/68; C02F 1/685; C02F 2103/00; C02F 2103/001; B01F 5/0473; B01F 5/0483; B01F 5/0619; B01F 5/0652; Y02W 10/37
USPC .................................. 210/744, 101
See application file for complete search history.

(56) References Cited

U.S. PATENT DOCUMENTS

2003/0024863 A1* 2/2003 Gannon ................ B01D 36/02 210/134
2004/0154965 A1* 8/2004 Baum ..................... C02F 1/722 210/85

OTHER PUBLICATIONS

Bhardwaj, A.K., R.A. Mclaughin. 2008. Simple Polyacrylamide Dosing Systems for Turbidity Reduction in Stilling Basins. Transactions of the ASABE. 51(5):1653-1662, 2008.
Haan, C.T., B.J. Barfield, J.C. Hayes. 1994. Design Hydrology and Sedimentology for Small Catchments. Oxford, UK: Academic Press of Elsevier Science,1994.
Droppo, I.G., K. Exall, K. Stafford. 2008. Effect of chemical amendments on aquatic floc structure, settling and strength. Water Research 42:169-179, 2008.
Jarvis, P., B. Jefferson, J. Gregory, S.A. Parsons. 2005. A review of floc strength and breakage. Water Research 39:3121-3137, 2005.
Rasteiro M.G., F.A.P. Garcia, P.J. Ferreira, E. Antunes, D. Hunkeler, C. Wandrey. 2010. Flocculation by Cationic Polyelectrolytes: Relating Efficiency with Polyelectrolyte Characteristics. Journal of Applied Polymer Science 116:3603-3612, 2010.
Mpofu, P., J. Addai-Mensah, J. Ralston. 2004. Flocculation and dewatering behavior of smectite dispersions: effect of polymer structure type. Minerals Engineering 17: 411-423, 2004.
Szabo, A., I. Takacs, S. Murthy, G.T. Daigger, I. Licsko, S. Smith. 2008. Significance of Design and Operational Variables in Chemical Phosphorous Removal. Water Environment Research 80(5): 407-416, 2008.
Chunjuan, D., L. Xiao, L. Bingnan, C. Suyun. 2009. Chemical Enhanced Phosphorus Removal from the Effluent of Micro-Aerobic EGSB System. Bioinformatics and Biomedical Engineering. In Proc. ICBBE 2009 3rd International Conference, 2009.
Auvray, F., E.D. Van Hullebusch, V. Deluchat, M. Baudu. 2006. Laboratory investigation of the phosphorus removal (SRP and TP) from eutrophic lake water treated with aluminum. Water Research 40(14):2713-2719, 2006.
Rodriguez, I.R., C. Amrhein, M.A. Anderson. 2008. Reducing dissolved phosphorous loading to the Salton Sea with aluminum sulfate. Hydrobiologia 604: 37-44, 2008.
Rodriguez, I.R., C. Amrhein, M.A. Anderson. 2008. Reducing dissolved phosphorous loading to the Salton Sea with aluminum sulfate. Hydrobiologia 604: 37-44, 2007.
Fort, D.J., E.L. Stover. 1995. Impact of Toxicities and Potential Interactions of Flocculants and Coagulant Aids on Whole Effluent Toxicity Testing. Water Environment Research 67(6):921-925, 1995.
Kang, J., Y. Li, S. Lau, M. Kayhanian, M.K. Stenstrom. 2007. Particle Destabilization in Highway Runoff to Optimize Pollutant Removal. Journal of Environmental Engineering 133(4) 426-434, 2007.
McLaughlin, R.A, A. Bartholomew. 2007. Soil Factors Influencing Suspended Sediment Flocculation by Polyacrylamide. Soil Science Society of America Journal 71 (2): 537-544, 2007.
Owen, A.T., P.D. Fawell, J.D. Swift, D.M. Labbett, F.A. Benn, J.B. Farrow. 2008. Using turbulent pipe flow to study the factors affecting polymer-bridging flocculation of mineral systems. International Journal of Mineral Processing 87: 90-99, 2008.
The Tahoe Keys Marina Project (http://www.waterboards.ca.gov/rwqcb6/publications_forms/available_documents/e_o_reports/2003/eor0303.pdf, 2002.
Sekine, M., A. Takeshita, N. Oda, M. Ukita, T. Imai, T. Higuchi. 2006. On-site treatment of turbid river water using chitosan, a natural organic polymer coagulant. Water Science and Technology 53(2): 155-181, 2006.
Wood, J., C. He, Q. Rochfort, J. Marsalek, P. Seto, M. Yang, P. Chessie, S. Kok. 2005. High-rate stormwater clarification with polymeric flocculant addition. Water Science and Technology 51(2):79-88, 2005.
Chakraborti, R. K., J. F. Atkinson, J. E. Van Benschoten. 2000. Characterization of Alum Floc by Image Analysis. Environ. Sci. Technol. 34(18): 3969-3976, 2000.

* cited by examiner

PASSIVE CHEMICAL DOSING AND MIXING APPARATUS AND METHOD

FIELD OF THE INVENTION

This disclosure is directed to the regulated injection of a chemical(s), solution(s) or material(s) hereafter referred to as chemicals into stormwater runoff, other surface waters or other fluid streams to promote the removal of a pollutant(s) or to alter the properties of the water. Specifically, and depending upon the types of chemicals injected, the physical, chemical and/or biological properties of the water can be altered. The invention provides a passive system to alter stormwater runoff or other surfaces. The system may be deployed at a remote site, such as a construction site, and implemented with minimal or zero external power requirements.

This application incorporates by reference the priority application U.S. 61/651,419 including the specification, claim(s) and figures presented therein and appendix A [a Master of Science Thesis entitled "Passive Chemical Dosing Apparatus For Construction Site Stormwater Turbidity Reduction" by Karl M. Garbrecht, Oklahoma State University, Stillwater, Okla., submitted December 2011] and appendix B [a slide presentation entitled "Passive Flocculant Dosing System For Construction Site Implementation" by Karl Garbrecht, Jason Vogel, Dan Storm and Bill Barfield presented at the International Symposium on Erosion and Landscape Evolution in Anchorage, Ak. on Sep. 19, 2011], both of which were included in the provisional application filing.

BACKGROUND OF THE INVENTION

Sediment stormwater runoff from construction sites can lead to water-quality degradation in surface-water systems. Current sediment-control strategies employed can be insufficient, or unreliable. In addition to sediment, there are other surface water quality issues where current control strategies are not economically viable, insufficient, or unreliable.

PRIOR ART

Commercially available passive-dosing mechanisms include flow-through coated fabrics, flocculant blocks, or floc logs. Floc logs are blocks of solid flocculant and filter fabrics are textiles with flocculant incorporated onto the material. Both systems are installed in the path of runoff and the principle of operation is the dissolution of flocculant into the bulk flow. These systems have been shown to be effective; however, there is little data on achieved dosing concentrations, which is undesirable due to the influence of concentration on effectiveness and potential toxicity concerns at high doses (Bhardwaj, A. K., R. A. Mclaughin. 2008. *Simple Polyacrylamide Dosing Systems for Turbidity Reduction in Stilling Basins. Transactions of the ASABE*. 51(5):1653-1662, hereafter Bhardwaj and McLaughlin, 2008).

Erosion is governed by the relationship of sediment entrainment, transport, and deposition. During transport, particles may settle out or become re-suspended as flow and runoff change during a storm event (Haan, C. T., B. J. Barfield, J. C. Hayes. 1994. *Design Hydrology and Sedimentology for Small Catchments*. Oxford, UK: Academic Press of Elsevier Science; here after Haan et al., 1994). The suspended sediment in construction-site runoff is comprised of various-sized particles with varying settling velocities. A significant portion of the suspended sediment is often too small to settle out in a sediment detention pond of practical size (Haan et al., 1994; Bhardwaj and McLaughlin, 2008). To enhance settling rates of the finer fraction, flocculation or coagulation amendments can be added to the solution which bind or bridge multiple particles together, thereby, increasing their effective size and ultimately their settling rate. Therefore, information concerning floc formation processes is of importance and must be considered in order to optimize the design of a passive chemical-dosing and mixing system.

There are many types of flocculation and coagulation mechanisms facilitated by various types of amendments available for particle destabilization. Coagulants typically destabilize particles through charge neutralization and differential settling where flocculants generally destabilize solutions through the formation of large flocs by bridging particles/colloids together and differential settling (Droppo, I. G., K Exall, K. Stafford. 2008. *Effect of chemical amendments on aquatic floc structure, settling and strength. Water Research* 42:169-179, here after Droppo et al., 2008; Jarvis, P., B. Jefferson, J. Gregory, S. A. Parsons. 2005. *A review of floc strength and breakage. Water Research* 39: 3121-3137, here after Jarvis et al., 2005). Amendments can also remove suspended particles through more than one mechanism making singular categorization of some amendments difficult (Rasteiro M. G., F. A. P. Garcia, P. J. Ferreira, E. Antunes, D. Hunkeler, C. Wandrey. 2010. *Flocculation by Cationic Polyelectrolytes: Relating Efficiency with Polyelectrolyte Characteristics. Journal of Applied Polymer Science* 116:3603-3612, here after Rasteiro et al., 2010; Mpofu, P., J. Addai-Mensah, J. Ralston. 2004. *Flocculation and dewatering behavior of smectite dispersions: effect of polymer structure type. Minerals Engineering* 17: 411-423, here after Mpofu et al., 2004). In addition, the physical and chemical properties of amendments vary which can influence coagulation/flocculation rates, removal efficiencies, and the characteristics of the corresponding flocs formed, such as density, floc strength, and floc size and shape. The toxicity to the environment from the injection of the amendments is also an issue.

Two general amendment types suitable for use with this invention, metal salts and polymers, will be described; however, many additional types of chemicals can be added to stormwater runoff, other surface waters or other fluid streams using the disclosed invention depending upon the specific circumstances of the site and purposes of the application.

Metal Salts

Metal salts such as aluminum (Al) and ferric (Fe) salts are available as coagulant amendment in several forms; alum (Al sulfate), poly Al chloride (Cl), FeCl, Fe sulfate, and pre-polymerized metal salts. Fe and Al salts have high cationic charge densities which make them ideal coagulant amendments. Both form metal hydroxides when added to water near neutral pH, and even though Al and Fe are chemically unique, they show similar efficiencies toward phosphorus (P) removal as well as a comparable pH dependency (Szabo, A., I. Takacs, S. Murthy, G. T. Daigger, I. Licsko, S. Smith. 2008. *Significance of Design and Operational Variables in Chemical Phosphorous Removal. Water Environment Research* 80(5): 407-416, here after Szabo et al., 2008), Metal salt removal efficiencies and floc formation kinetics are concentration dependent where an increase in coagulant or primary particles leads to an increase in floc formation (Chunjuan, D., L. Xiao, L. Bingnan, C. Suyun. 2009. *Chemical Enhanced Phosphorus Removal from the Effluent of Micro-Aerobic EGSB System. Bioinformatics and*

Biomedical Engineering. In Proc. ICBBE 2009 3rd International Conference, here after Chunjuan et al., 2009; Auvray, F., E. D. Van Hullebusch, V. Deluchat, M. Baudu. 2006. *Laboratory investigation of the phosphorus removal (SRP and TP) from eutrophic lake water treated with aluminum.* Water Research 40(14):2713-2719, here after Auvray et al., 2006; Rodriguez, I. R., C. Amrhein, M. A. Anderson. 2008. *Reducing dissolved phosphorous loading to the Salton Sea with aluminum sulfate.* Hydrobiologia 604: 37-44, here after Rodrigues et al., 2008; Georgantas, D. A., H. P. Grigoropoulou. 2007. *Orthophosphate and metaphosphate ion removal from aqueous solution using alum and aluminum hydroxide.* Journal of Colloid and Interface Science 315(1): 70-79, here after Georgantas and Grigoropoulou, 2007; Szabo et al., 2008). The toxicity of metal salts is different for various chemical species and is influenced by the concentration and solution chemistry (pH); however, they are less toxic than cationic polymer flocculants (Droppo et al., 2008; Fort, D. J., E. L. Stover. 1995. *Impact of Toxicities and Potential Interactions of Flocculants and Coagulant Aids on Whole Effluent Toxicity Testing.* Water Environment Research 67(6):921-925, here after Fort and Stover, 1995). For these reasons, it is important to assess the sensitivity of potentially impacted environments on an individual basis before chemical addition to surface waters is considered.

Polymers

Polymers include a broad category of chemical species used to destabilize solutions through flocculation and coagulation (Droppo et al., 2008; Mpofu et al., 2004). Droppo et al. (2008) reported that coagulant polymers generally have high charge densities with low molecular mass in comparison to flocculant polymers, which have a lower charge densities and higher molecular mass. Polymers are available in a wide range of molecular weights, charge densities, and mixtures. Polymer destabilization is a function of flocculant added but over dosing can result in charge reversal, which can stabilize particles in solution (Kang, J., Y. Li, S. Lau, M. Kayhanian, M. K. Stenstrom. 2007. *Particle Destabilization in Highway Runoff to Optimize Pollutant Removal.* Journal of Environmental Engineering 133(4) 426-434, here after Kang et al., 2007; McLaughlin, R. A., A. Bartholomew. 2007. *Soil Factors Influencing Suspended Sediment Flocculation by Polyacrylamide.* Soil Science Society of America Journal 71 (2): 537-544, here after McLaughlin and Bartholomew, 2007). Cationic polymers exhibit higher toxicities than anionic or neutral polymers and, therefore, may not be as suitable to natural environments (Droppo et al., 2008; McLaughlin and Bartholomew, 2007; Fort and Stover, 1995). McLaughlin and Bartholomew (2007) studied anionic and nonionic polymer flocculation efficiencies on various soils and found that flocculation was highly dependent on soil type and a mixture of polymers may be an appropriate solution. It should also be noted that polymers can have high viscosities in comparison to water which could also be a significant design consideration for injection and mixing systems as noted in experiments by Owen et al. (2008) (Owen, A. T., P. D. Fawell, J. D. Swift, D. M. Labbett, F. A. Benn, J. B. Farrow. 2008. *Using turbulent pipe flow to study the factors affecting polymer-bridging flocculation of mineral systems.* International Journal of Mineral Processing 87: 90-99, here after Owen et al., 2008).

Tahoe Keys Marina Project 2002: The Tahoe Keys Marina Project (http://www.waterboards.ca.gov/rwqcb6/publications_forms/available_documents/e_o_reports/2003/eor0303.pdf) utilized chitosan, a biological polymer and a naturally derived and biodegradable flocculant, to increase sedimentation rates in detention ponds during a dredging project in 2002. The treatment system included three in-series detention ponds consisting of a large particle-settling forebay, secondary-treatment pond, and a tertiary-treatment pond. Effluent from the forebay flowed through filter socks integrated with chitosan into the secondary-treatment pond they through the chitosan filter socks again and into the tertiary settling pond. Dosing and mixing occurred passively as flow moved from one pond to the next through the filter socks. Inflow turbidity was typically over 1000 nephelometric turbidity units [NTU] and was reduced below 20 NTU with the passive-dosing system to meet water-quality standards. It should also be noted that solid flocculant blocks have been successfully employed in the same manner as the filter socks in construction-site applications. However, one drawback is the dosing uncertainty associated with passive filter socks and floc blocks (Bhardwaj and McLaughlin, 2008).

On-site treatment of turbid river water using chitosan 2006: Sekine et al. (2006) (Sekine, M, A. Takeshita, N. Oda, M. Ukita, T. Imai, T. Higuchi. 2006. *On-site treatment of turbid river water using chitosan, a natural organic polymer coagulant.* Water Science and Technology 53(2): 155-181, here after Sekine et al., 2006) used 1.5 mg/l of a 1:1 chitosan:acetic acid agent to treat turbid river water caused by bridge construction with encouraging results. The coagulant was actively pumped into the flow where mixing occurred in downstream rapids with settling occurring in downstream pools. It was found that this noted dosage, which was below the acute toxicity for *Oryzias latipes* in 48LC50 [concentration of a substance that is lethal to 50 percent of the test organisms within 48 hours], reduced turbidity from nearly 900 NTU to <10 NTU 600 m downstream of the construction. Sekine et al. (2006) noted abnormal behavior was observed in the toxicity tests as well as in fish during the field test. However, the author could not attribute the behavior to toxicity based to the potential influence of high turbidities on aquatic organisms and increased viscosities caused by chitosan.

Storm water Treatment 2005: Wood et al. (2005) (Wood, J., C. He, Q. Rochfort, J. Marsalek, P. Seto, M. Yang, P. Chessie, S. Kok. 2005. *High-rate stormwater clarification with polymeric flocculant addition.* Water Science and Technology 51(2): 79-88, here after Wood et al., 2005) achieved near 80% total suspended solids (TSS) removal through chemical flocculation from stormwater with 4 mg/l of cationic polymer which did not increase effluent toxicity based on rainbow trout toxicity tests. The study successfully used inline static mixers for flocculant mixing without clogging and dosing was controlled with a peristaltic pump. The suspended sediments removed from solutions had high metal concentrations, which would need to be disposed of in accordance with regulatory guidelines.

OBJECTIVES OF THE INVENTION

The objective of this invention is to provide an automated, regulated passive chemical-dosing system which can be implemented at a construction site or other remote area to permit injection of chemical(s) into stormwater runoff, other surface waters or other fluid streams to promote the removal of a pollutant(s) or to alter the properties of the fluid stream. Specifically, and depending upon the types of chemicals injected, the physical, chemical and/or biological properties of the fluid stream can be altered in a regulated manner.

DETAILED DESCRIPTION OF THE PREFERRED EMBODIMENTS

Figure 1:
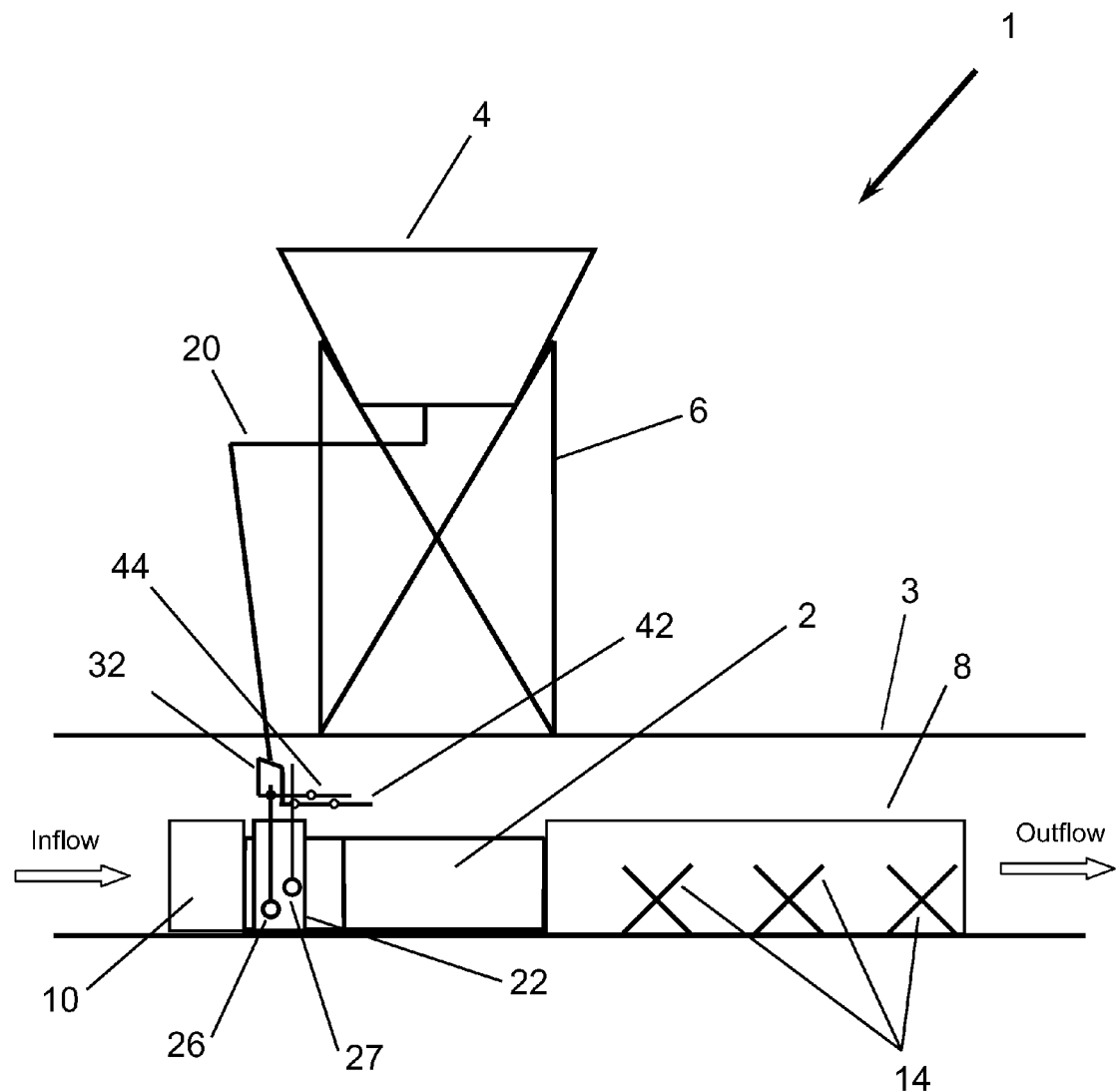
FIG. 1 is a side view of an amendment dosing and mixing apparatus according to the present disclosure.

In one embodiment, a dynamic, flow-regulated, chemical-injection system coupled with a passive (self-powered) mixing apparatus to enhance settling efficiency through flocculation is disclosed. The apparatus comprises a flow-control structure, a dosing system, and a mixing system. Liquid flocculant or other chemicals may be injected into the stormwater flow or other surface waters at the flow-control structure using a passive, flow-controlled dosing system so the chemical or chemicals are injected at a desired concentration. This may be at a rate necessary to promote optimal floc formation, chemical precipitation, or other outcomes. In the case of using a flocculant, for example, the apparatus of the present invention can optimize flocculation and minimize the quantity of flocculent used, thereby reducing costs and/or risk of flocculant toxicity risk to downstream aquatic organisms. Risk of the occurrence of charge reversal on the flocculated particles can also be mitigated. The mixing system may be a fixed structure designed to create turbulence and facilitate optimal chemical mixing or flocculent/particle interactions for efficient flocculation. Various embodiments are standalone, automated and low maintenance.

Suspended sediment in runoff is comprised of various sized particles with varying settling velocities. A significant portion of the suspended sediment is often too small to settle out of the flow in a detention pond of practical size. To enhance settling rates, flocculation or coagulation amendments are added which bind to particles or bridge multiple particles together, thereby, increasing their effective size and ultimately their settling rate.

Chemically enhanced flocculation/coagulation has been utilized extensively in wastewater treatment plants (WWTP), during mining operations, and in-situ phosphorus removal in lakes, reservoirs, and wetlands. Various embodiments of the present invention utilize chemical injection to enhance sediment flocculation/coagulation in construction site runoff collected in a detention pond to reduce runoff turbidity. While the underlying processes of interest concerning the application of flocculation/coagulation systems on a construction site and the other operations are similar, there are differences that must be considered. For instance, a WWTP is a permanent facility; therefore, the construction of a permanent flocculation/coagulation system is feasible. In contrast, a construction site is a temporary operation and a mobile structure may be utilized as opposed to a permanent structure. Additionally, a WWTP is a continuous operations with known flow rates and constituent loadings, whereas construction sites will experience intermittent highly variable flows and sediment loads which the flocculation system must accommodate.

It is understood that various embodiments of the present invention may be useful for application of flocculant/coagulant in a controlled manner to a fluid stream. However, it will be appreciated that various embodiments of the present disclosure are readily adapted to controlled application and mixing of a multitude of various chemicals to a multitude of various types of fluid streams. It is also understood that the application environments of the various embodiments of the present disclosure are not limited to those explicitly discussed. For example, constructed wetlands are also an application of embodiments of the present invention were a passive system may be needed. This may be due to lack of electricity or power but it is also understood that embodiments of the present disclosure may be selected for other reasons as well.

According to the present disclosure, an optimized system must take into account mixing mechanisms, flow rate, and, where possible, constituent loadings. In a construction-site application, an unmanned or automated embodiment may be utilized where mechanically actuated dosing and mixing operations are implemented over active or manned systems.

The system must have power to operate; however, it is undesirable to rely on externally supplied power. Therefore, it is envisaged that the power source used for operation will be readily available at the site, such as gravity, power from the flow of fluid through the system, or solar power. According to various embodiments of the present disclosure, sediment flux is correlated with flow, allowing flow rate to be used to regulate flocculant dosing. Therefore, the present system is a dynamic, flow-regulated chemical injection system coupled with a passive (self-powered) mixing apparatus. In various embodiments, systems of the present disclosure are:

(1) Standalone, passive and automated;
(2) Mobile and cost-effective; and
(3) Able to maintain specific chemical concentrations in stormwater runoff, other surface waters or other fluid streams within acceptable limits during operation.

Figure 2:
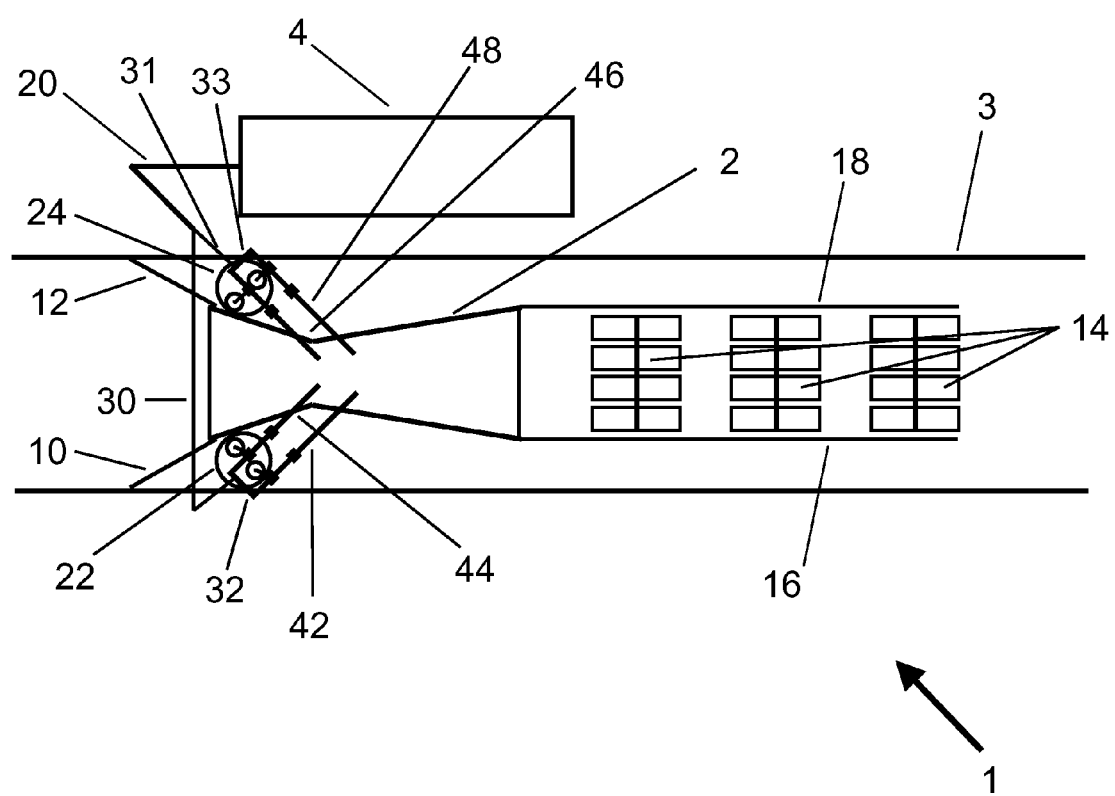
FIG. 2 is a plan view of the amendment dosing and mixing apparatus of FIG. 1.
Figure 5:
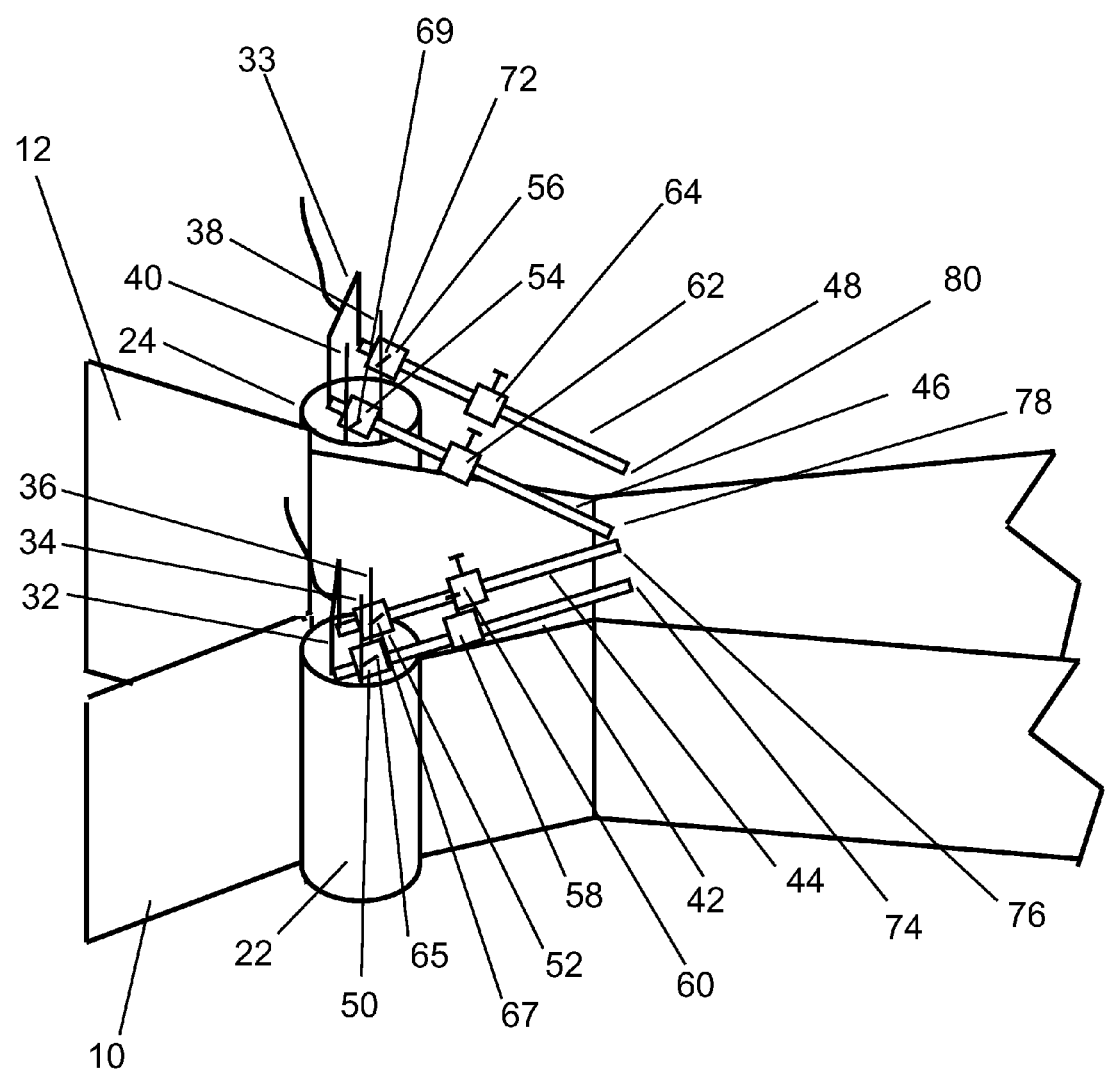
FIG. 5 is a perspective view of a portion of the amendment dosing and mixing apparatus of FIGS. 1 and 2.

FIG. 1 is a side view of one embodiment of the passive chemical dosing and mixing apparatus 1 of the invention disposed in a fluid flow guide channel 3. FIG. 2 is a plan view of the same embodiment. FIG. 5 is a perspective view of a portion of the structure shown in FIGS. 1 and 2. The elements of these three figures will be described together. This embodiment comprises a flow-control structure, a dosing system, and a mixing structure.

The flow-control structure 2 shown in the figures is a cutthroat flume. Although other types of flow-control structures will work, a cutthroat flume is a desirable flow-control structure for this invention because of its well-known ability to discharge a wide range of flows and tolerate high back-water conditions without affecting the stage-discharge relationship. The necessary principal of operation for the flow-control structure of the invention is a predetermined relationship between stage [fluid-flow depth] and discharge. In this embodiment, the cutthroat flume 2 is emplaced in a fluid flow channel 3. Two forward fluid-flow guides 10 and 12 extend from the forward portion of flume 2 to the walls of the fluid-flow guide channel 3 to guide all of the fluid flowing in the channel 3 into the mouth of the cutthroat flume 2.

The dosing system dispenses a regulated flow of amendment chemical(s) from reservoir 4 into the fluid flowing through flume 2. The dosing system comprises an amendment reservoir, a plurality of amendment-dispensing tubes, and a system for regulating amendment flow through the amendment-dispensing tubes in proportion to the fluid depth in the flow control structure. An amendment-chemical(s) reservoir 4 is supported to one side of the fluid-flow guide channel 3 by reservoir support structure 6. Flume 2 is secured in the fluid-flow channel 3 at a first height. Reservoir 4 is maintained at a second height elevated above flume 2 to permit amendment to feed by gravity through amendment-feed line 20 through the amendment-dispensing tubes and to be discharged at the amendment-dispensing end, 74, 76, 78 and 80 for each corresponding amendment-dispensing tube 42, 44, 46 and 48. Amendment-dispensing tubes 42, 44, 46 and 48 are maintained at a third height between the first and second heights such that amendment may flow by gravity from reservoir 4 through the dispensing tubes and into the fluid flowing through flume 2. Amendment-dispensing tubes 42, 44, 46 and 48 are supported by any desirable support structure [not shown in the drawings for clarity].

The system for regulating amendment flow through amendment-dispensing tubes 42, 44, 46 and 48 utilizes front and rear stilling wells 22 and 24 with multiple floats therein and float-actuated on-off valves on each amendment tube. An additional fluid-flow control valve is emplaced on each amendment tube to further regulate the amount of amendment flowing through the amendment tube per unit of time once the on-off valve in the amendment tube is actuated to allow amendment to flow into the tube.

Front and rear stilling wells 22 and 24 are emplaced in a well-known manner beside the forward portion of flume 2 and in hydraulic communication with flume 2. Front amendment-dispensing tubes 42 and 44 are positioned over the top portion of front stilling well 22 and rear amendment-dispensing tubes 46 and 48 are positioned over the top portion of rear stilling well 24. As is well-known in this art, when fluid flows through flume 2 a portion of the fluid flow will enter each stilling well. Again as is well-known in this art, the fluid level in the each stilling well will quickly reach the same level of the fluid flowing through flume 2. Thus, the fluid level in each stilling well 22 and 24 will reach the same stage [flow depth] as the stage [flow depth] of the fluid in flume 2 and the level of fluid in each stilling well 22 and 24 will be essentially equal.

Figure 3:
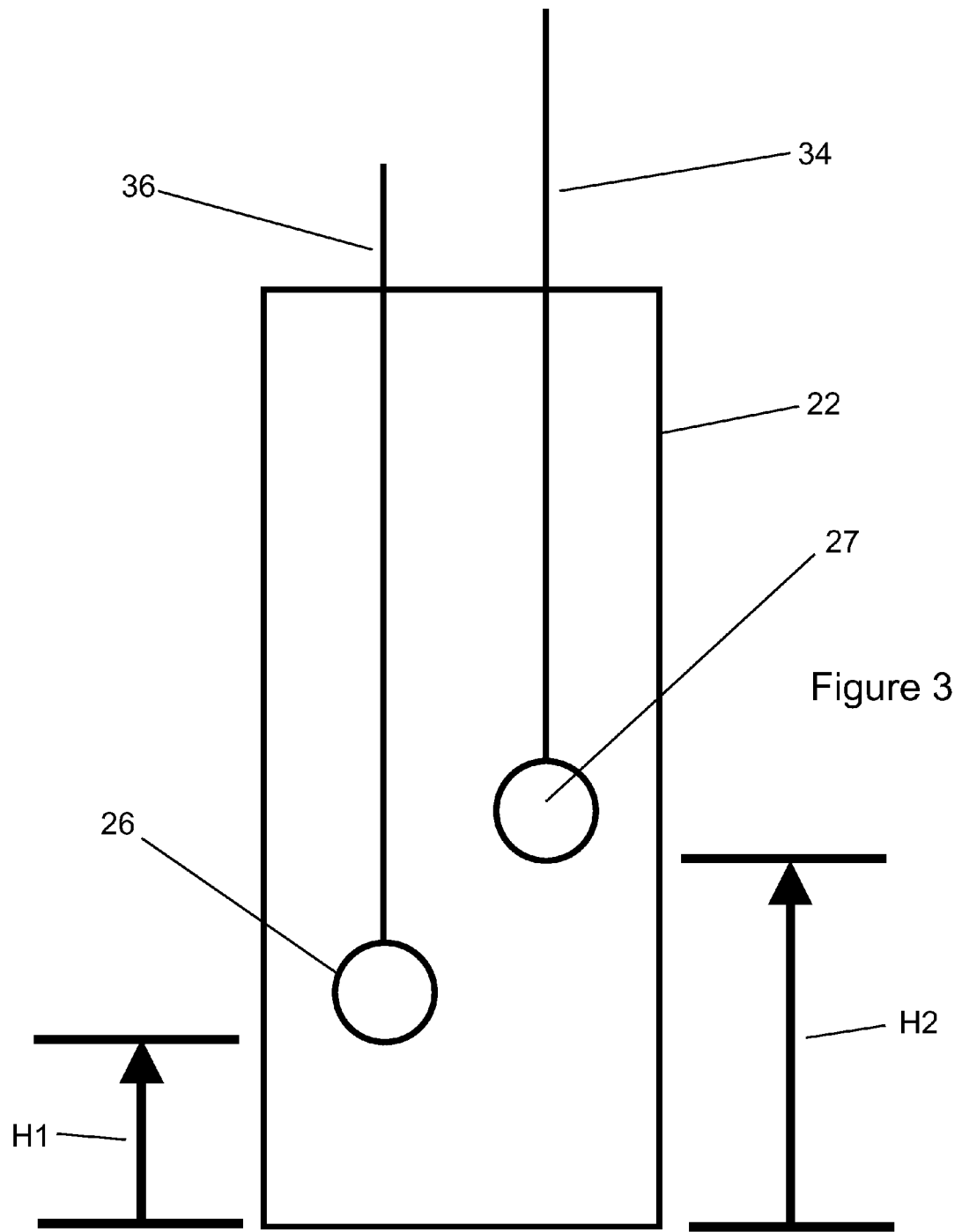
FIG. 3 is a cross-sectional view of front stilling well 22 showing the positioning of floats 26 and 27 in the stilling well.

As is shown in FIG. 3, front stilling well 22 has two floats 26 and 27 therein. Floats 26 and 27 each have an elongated extension rod 36 and 34 connected thereto. Float 26 is maintained by any desired means [not shown in the figures for clarity] at a first predetermined height H1 above the base of stilling well 22 such that float 26 may freely rise or fall when contacted by fluid in stilling well 22 but such that it may not descend lower than height H1. Float 27 is likewise maintained at a second predetermined height H2 above the base of stilling well 22 by any desired means [also not shown in the figures for clarity] such that float 27 may freely rise or fall when contacted by fluid in stilling well 22 but such that it may not descend lower than height H2. As the fluid level rises in stilling well 22, float 26 will first contact the fluid and be carried upwards with rising fluid levels. As fluid continues to rise in stilling well 22, float 27 will be carried upwards by the rising fluid. It should be noted that height H1 is less than height H2.

Figure 4:
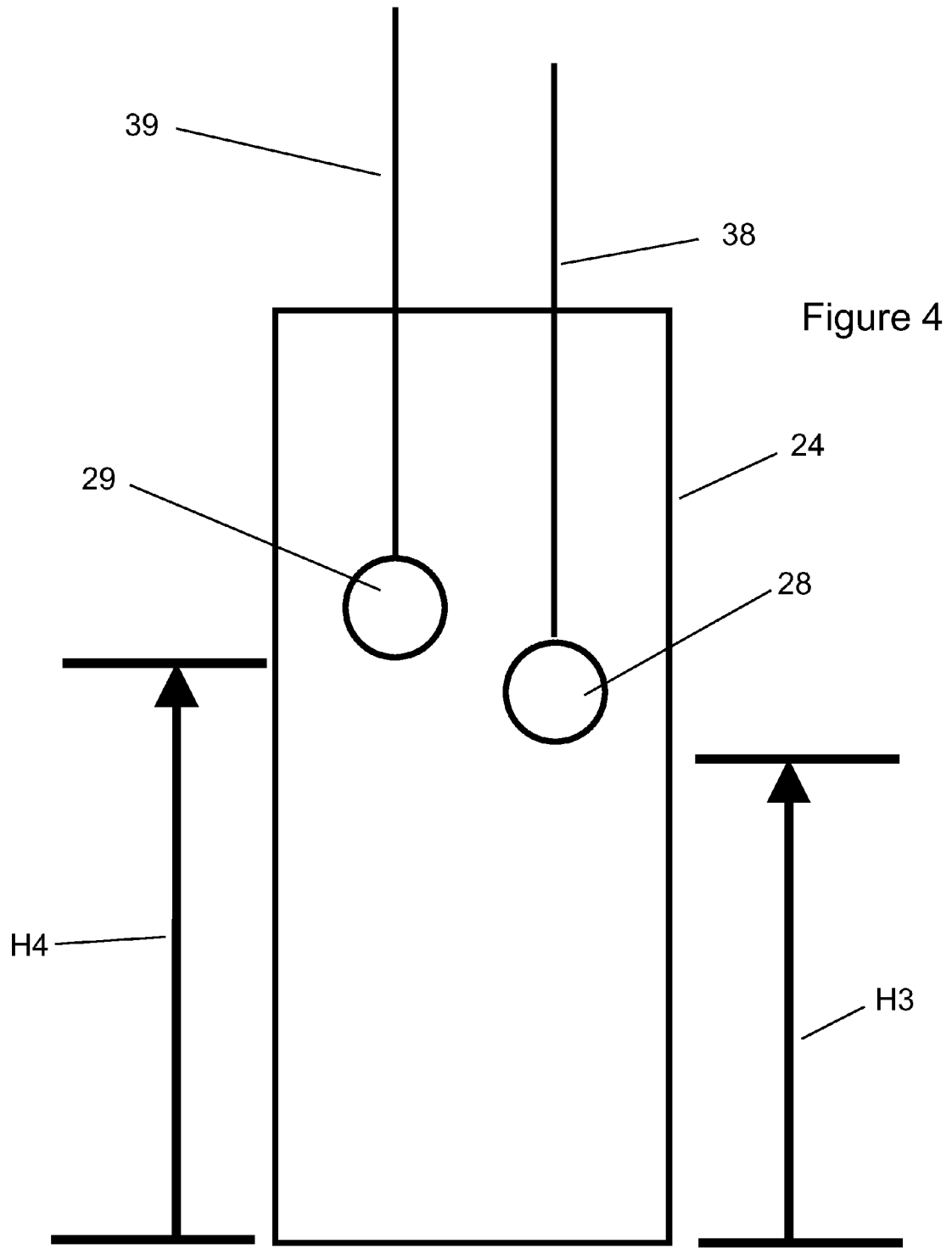
FIG. 4 is a cross-sectional view of rear stilling well 24 showing the positioning of floats 28 and 29 in the stilling well.

In like manner [as shown in FIG. 4] rear stilling well 24 has two floats 28, 29 contained therein and each float 28 and 29 has an extension rod 38 and 40 connected thereto. Float 28 is maintained at a third height H3 above the base of stilling well 24 by any desired means [not shown in the figures for clarity] such that float 28 may freely rise or fall when contacted by fluid in stilling well 24 but such that it may not descend lower than height H3. Float 29 is maintained at a fourth height H4 above the base of stilling well 24 by any desired means [also not shown in the figures for clarity] such that float 29 may freely rise or fall when contacted by fluid in stilling well 24 but such that it may not descend lower than height H4. As with stilling well 22, as the fluid level rises in stilling well 24 float 28 will first be contacted by the rising fluid and then float 29.

It should be noted that height H3 is less than height H4 and that heights H1 and H2 are also less than height H3. It should also be noted that the relative spacing between heights H1, H2, H3 and H4 is not uniform. These float heights are chosen such that the floats are engaged by the rising fluid at heights which correspond to predetermined discharge rates for the fluid flowing through flume 2. Again, as is well-known in this art, fluid discharge through a cutthroat flume is not linear with fluid stage [depth].

Front amendment-dispensing tubes 42 and 44 are connected at one end by a front amendment header, which is connected to amendment reservoir 4 via a front amendment feed line 30 and amendment feed line 20. In like manner, the rear amendment dispensing tubes 46 and 48 are connected at one end by a rear amendment header 33 which is connected to amendment reservoir 4 via a rear amendment feed line 31 and amendment feed line 20. Amendment is dispensed in a regulated manner by dispensing tubes 42 and 44 through the operation of float-actuated on-off valves and flow-control valves.

First front amendment-dispensing tube 42 has an on-off valve 50 positioned near the rear end of the tube and a flow control valve 58 positioned upstream of on-off valve 50. Second front amendment-dispensing tube 42 has an on-off valve 52 positioned near the rear end of the tube and a flow-control valve 60 positioned upstream of on-off valve 52. First rear amendment dispensing tube 46 has an on-off valve 54 positioned near the rear end of the tube and a flow-control valve 62 positioned upstream of on-off valve 54. Second rear amendment-dispensing tube 48 has an on-off valve 56 positioned near the rear end of the tube and a flow-control valve 64 positioned upstream of on-off valve 56.

As the stilling-well fluid levels rise [reflecting, in a well-known manner, increasing discharge in flume 2], the floats in stilling wells 22 and 24 will be contacted by the rising fluid causing the float extension rods to rise out of the stilling wells. Each extension rod 34, 36, 38 and 40 is connected to a corresponding on-off valve 50, 52, 54 and 56 by a corresponding actuating link 65, 67, 69 and 72 to permit the extension rods to turn the on-off valves on or off as the rods rise and/or fall. As each float 26, 27, 28 and 29 is contacted by rising fluid in its stilling well and forced to rise upwardly, its corresponding extension rod 34, 36, 38 and 40 also rises out of the stilling well causing the corresponding on-off valve 50, 52, 54 and 56 in each amendment-dispensing tube, 42, 44, 46 and 48, to be actuated to turn the amendment flow on in series in each corresponding amendment dispensing tube. Thus, with rising fluid in the stilling wells, on-off valve 50 will be actuated first, then on-off valve 52, then on-off valve 54 and finally on-off valve 56. As the fluid levels fall in the stilling wells, the floats and their corresponding extension rods will fall and cause their corresponding on-off valves to be turned off in reverse order.

To refine the amendment flow in each amendment-dispensing tube 42, 44, 46 and 48 once the corresponding on-off valve 50, 52, 54 or 56 has actuated amendment flow in the tube, a fluid-flow control valve 58, 60, 62 and 64 is inserted into each corresponding tube 42, 44, 46 and 48 downstream of the corresponding on-off valves 50, 52, 54 and 56. These flow-control valves can be simple gate valves or any other suitable type of flow-control device, which can be pre-set to regulate the amount of amendment flowing through each amendment dispensing tube per unit of time. In this manner, the proportion of amendment added per unit of flume discharge [volume] can be closely regulated.

As described above, the floats are positioned at predetermined heights in the stilling wells and these heights correspond to a predetermined discharge [volume] in flume 2. Since the proportion of amendment added per unit of time per unit of flume discharge [volume] can be easily regulated, the disclosed amendment-dispensing system will cause a predetermined amount of amendment to be added at a rate approximately uniform to the flume discharge. Four amendment-dispensing tubes are shown in the preferred embodiment, but more or fewer tubes could be utilized, as desired, to control the proportion of amendment dispensed per unit of flume discharge as closely as is necessary for a particular application. All of this can be accomplished with the disclosed system in a remote area without any external power in an automated and regulated fashion.

Figure 6:
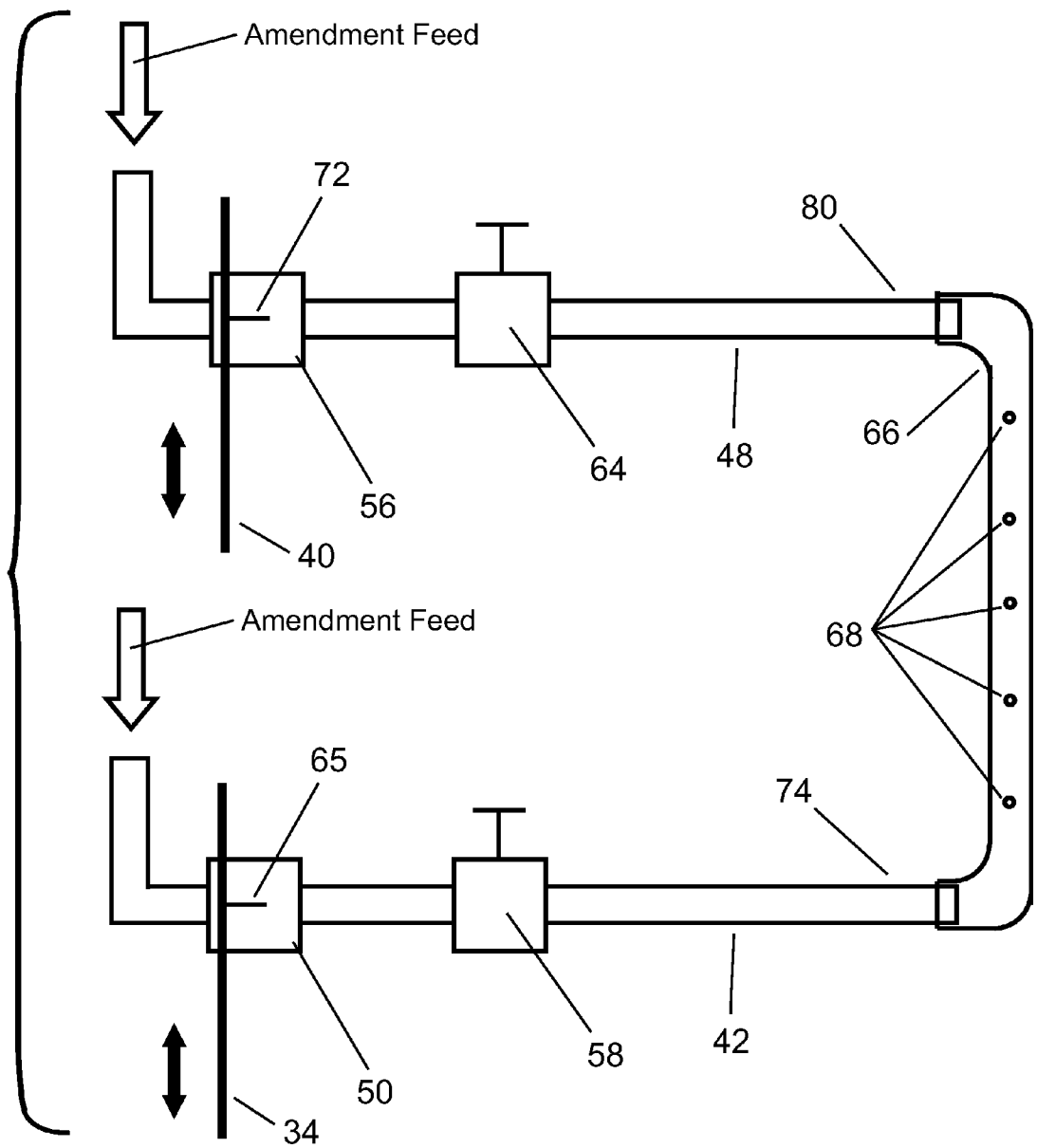
FIG. 6 is a view of portions of the amendment dosing and mixing apparatus shown in FIGS. 1 and 2.

FIG. 6 further illustrates the relationship of the extension rods to the on-off valves in the amendment-dispensing tubes. Two of the four amendment-dispensing tubes 42 and 48 are shown in FIG. 6. As extension rod 34 is caused to move upwardly in response to rising fluid levels in stilling well 22, it actuates on-off valve 50 by means of the actuating link 66 causing amendment from the reservoir to enter amendment-dispensing tube 42. Amendment-dispensing tube 42 has a further flow-control valve 58 [shown here as a gate valve, but any suitable flow-control device could be utilized] which is preset to control the amount of amendment flow in tube 42 per unit of time once on-off valve 50 has turned on the amendment flow in tube 42. As extension rod 34 falls in response to falling fluid levels in stilling well 22, on-off valve 50 will be turned off to stop the flow of amendment to tube 42. In similar fashion, as extension rod 40 rises, in response to rising fluid levels in stilling well 24, it will actuate on-off valve 56 of amendment-dispensing tube 48 and turn on the flow of amendment in tube 48. The pre-set flow control valve 64 in tube 48 will control the amount of amendment flow in tube 48 per unit of time once on-off valve 56 has turned on the amendment flow in tube 48. As extension rod 40 falls in response to falling fluid levels in stilling well 24, on-off valve 56 will be turned off to stop the flow of amendment to tube 48.

FIG. 6 further illustrates the optional diffuser apparatus, which may be employed to further regulate the flow of amendment from tubes 42 and 48. In this embodiment, the diffuser comprises a length of tubing 66 with a plurality of spaced holes 68 therein. As amendment is dispensed from the dispensing ends 74 and 80 of amendment-dispensing tubes 42 and 48, it is fed into the diffuser tube 66 and dispensed from holes 68 therein. As the diffuser tube is placed over the discharge area of flume 2, this aids in more uniform distribution of amendment across the fluid flow. Obviously, any suitable type of diffuser apparatus could be used within the scope of this invention.

The mixing structure 8 of this embodiment of the disclosed invention comprises an extension of the outflow section of flume 2. Front 16 and rear 18 side walls are provided for the mixing structure to guide the fluid flowing out of the outflow end of flume 2 downstream. As is well known in this art, the height and slope of the downstream portion of the cutthroat flume 2 and the outflow section where the static mixers 14 are located can be adjusted to produce a hydraulic jump downstream of its outflow section. This hydraulic jump will aid in mixing the amendment dispensed by the dosing system by providing turbulence. In addition, a series of static mixers 14 are provided in mixing structure 8 to provide additional turbulence to further mix the amendment into the fluid flow. These static mixers comprise a plurality of rectangular paddles oriented at a suitable angle to the fluid flow [approximately 45° to the horizontal] attached to each other in the center of each paddle but with each paddle rotated 90° to its immediate neighbor. The result is a series of "X" shaped paddles as shown in FIG. 1. It should be noted that other static mixer(s) could be used to promote mixing of the amendment.

One purpose of the static mixers 14 are is to generate turbulent flow conditions following flocculant injection in order to enhance interaction between flocculant molecules and suspended particles. Prober mixing can be important to facilitate efficient flocculation. Another important consideration when evaluating floc formation and removal in flocculating and coagulation systems is the mixing regime. Proper mixing of the injected flocculant with the flow is needed to promote collisions between flocculant and suspended particles. Initially, elevated mixing intensities increase particle collisions due to increased turbulence, which promote rapid growth; however, increased mixing intensities also increase shear, which can lead to floc breakage (Chakraborti, R. K., J. F. Atkinson, J. E. Van Benschoten. 2000. *Characterization of Alum Floc by Image Analysis. Environ. Sci. Technol.* 34(18): 3969-3976, here after Chakraborti et al., 2000; Spicer, P. T., S. E. Pratsinis. 1996. *Shear-Induced Flocculation: The Evolution of Floc Structure and the Shape of the Size Distribution at Steady State. Water Research* 30(5): 1049-1056, here after Spicer and Pratsinis, 1996; Szabo et al., 2008; Haan et al., 1994). For example, Szabo et al. (2008) observed this initial period of high floc formation to be less than a minute for high mixing intensities. The study also found this initial time period to increase as the mixing intensity decreases; therefore, high mixing intensities should be utilized as close as possible to the amendment dosing location to maximize initial floc formation (Szabo et al., 2008). In relation to steady state, floc size is an equilibrium point between floc growth and floc breakage reached after a sufficient time (Chakraborti et al., 2000; Spicer and Pratsinis, 1996; Haan et al., 1994). Furthermore, the efficiency of floc formation, i.e. the amount of collisions resulting in floc development, is impacted by floc shape and size (Chakraborti et al., 2000). Owen et al. (2008) discussed floc formation through flocculating mechanisms with respect to a growth, peak, and breakage phase. In the growth phase, flocs were still forming, the peak was when flocs were the largest, and the breakage phase was when the flocculant no longer actively bridged particles and the breakage was dominant (Owen et al., 2008). In charge neutralization floc formation, flocs continue to form or reform after breaking, which is a key difference between flocculants and coagulants (Owen et al., 2008). Therefore, chemical amendment must be considered during design of a mixing apparatus because flocculation will be irreversibly reduced at extended mixing times (Owen et al., 2008).

The same or similar concepts apply to other chemical additions. Therefore, in some embodiments, a mixing apparatus is an integral part of the system. Fixed structures provide the basis for the open channel mixing system in some embodiments. However, any structure, which generates turbulence, will aid in flocculation, at least to a degree. Additionally, a flow control structure for regulating flow in the sedimentation basin downstream of the injection and mixing apparatus provides stage control within the mixing system and the development of a hydraulic jump at the entrance to the mixing system. A hydraulic jump is a highly turbulent flow phenomenon, which also contributes to mixing within the designed system.

Figure 7:
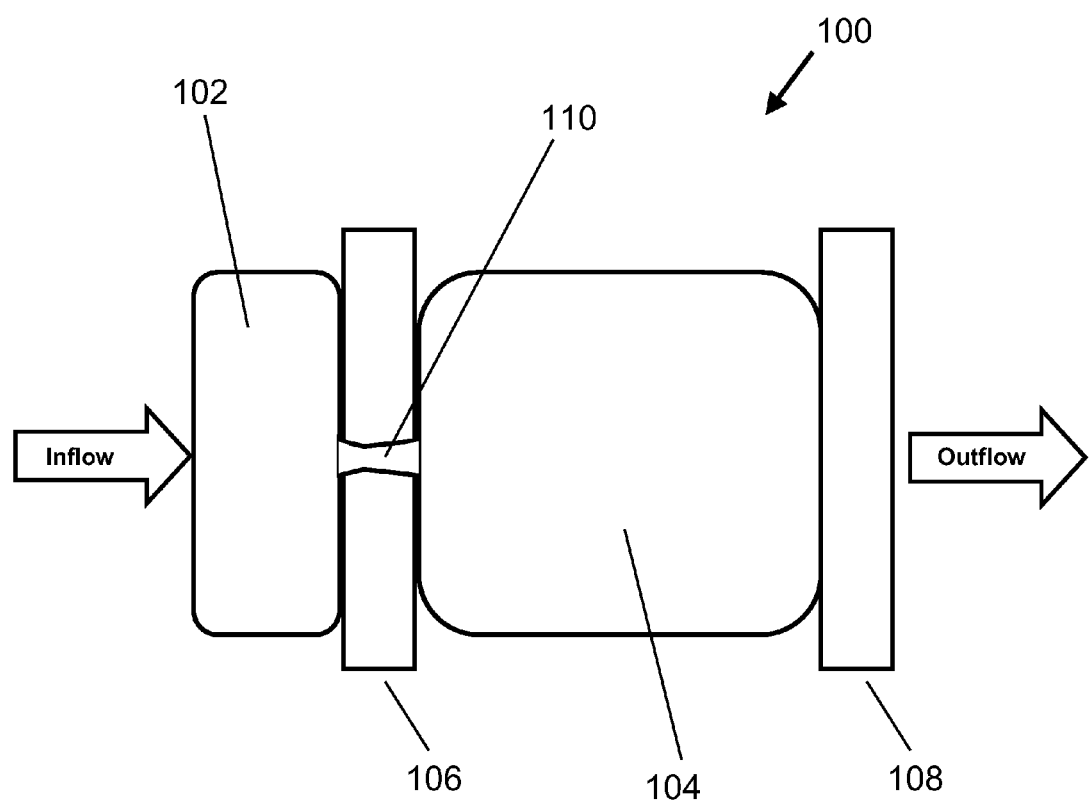
FIG. 7 is a plan view of a construction/remote site installation of the amendment dosing and mixing apparatus of the present disclosure.

FIG. 7 is a plan view of a construction/remote site installation of the amendment dosing and mixing apparatus of the present disclosure. Stormwater runoff flows into system from the left as shown by the "Inflow" arrow. The stormwater flows into a forebay 102. A forebay dam 106 impounds the stormwater. A settling pond 104 is provided downstream from forebay 102. As known in the art, depending upon the application, the settling pond is typically larger than the forebay. In addition, as known in the art, a settling pond dam 108 impounds water but allows treated stormwater to discharge through the dam 108 via a control structure (s). A chemical injection and mixing apparatus according to the invention is provided in the forebay dam 106. Only a portion of the sediment/pollutants in stormwater entering the forebay will settle out of the stormwater in the forebay. The stormwater then flows through the flow-control structure, chemical injection and mixing apparatus 110, treated and released into the settling pond 104 where additional sediment/pollutants in the stormwater are removed. The treated water is then discharged through the dam 108 via a control structure(s).

The described embodiments, are therefore able to satisfy the previously stated needs and objectives. In various embodiments the system:

(1) Uses a stage-discharge relationship of a flow-control structure to preposition floats connected to float valves that allows passive, standalone flocculant dosing to actuate and terminate at designed discharges.
(2) Employs valves in a passive flocculant-dosing apparatus to control flocculant-flow rates during operation.
(3) Uses the depicted open-channel mixing structures, which were developed by modifying existing inline static mixers for pipes.
(4) Uses a backwater control structure to induce a hydraulic jump at a desired location to facilitate chemical mixing.

Figure 8:
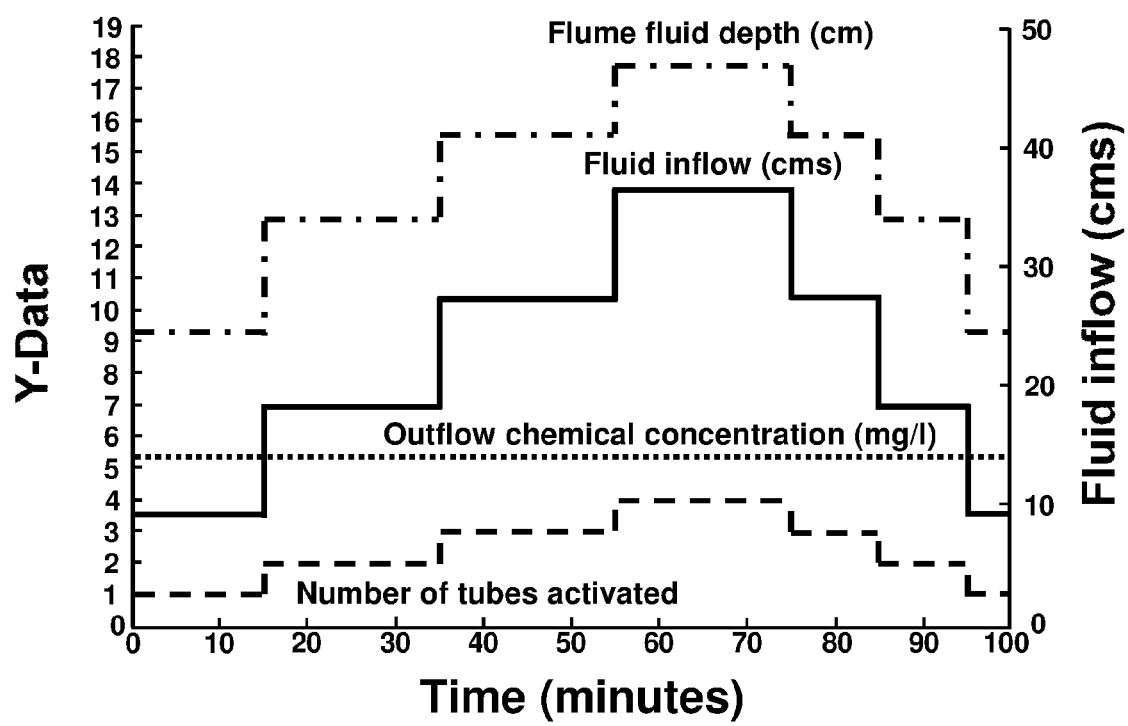
FIG. 8 is a graph illustrating the operation of applicants' invention.

FIG. 8 is a graph explaining the operation of applicant's invention. The left-hand ordinate is a data axis with numerical values for the number of valves actuated, for the outflow of chemical concentration in mg/l, and for the flume fluid depth in cm. The right-hand ordinate gives the fluid inflow to the cutthroat flume in $m^3$/second. The bottom axis gives the elapsed time in minutes. For example, at time T=0 minutes the test begins with approximately 9 $m^3$/second of fluid flowing into the cutthroat flume. This fluid flow results in a fluid depth in the cutthroat flume of approximately 9.3 cm and this fluid depth causes the first tube to be turned on to dispense chemical into the flowing fluid. At time T=15 minutes the fluid inflow is increased to approximately 18 $m^3$/second. This fluid flow results in a fluid depth in the cutthroat flume of approximately 13 cm and causes the second tube to be turned on to dispense chemical to the flowing fluid. At time T=35 minutes the fluid inflow is increased to approximately 27 $m^3$/second of fluid flowing into the cutthroat flume. This fluid flow results in a fluid depth in the cutthroat flume of approximately 15.5 cm and causes the third tube to be turned on to dispense chemical to the flowing fluid. At time T=55 minutes the fluid inflow is increases to approximately 37 $m^3$/second of fluid flowing into the cutthroat flume. This fluid flow results in a fluid depth in the cutthroat flume of approximately 17.6 cm and causes the fourth tube to be turned on to dispense chemical to the flowing fluid. At time T=75 minutes the fluid inflow is decreased to approximately 27 $m^3$/second of fluid flowing into the cutthroat flume. This fluid flow results in a fluid depth in the cutthroat flume of approximately 15.5 cm and causes the fourth tube to be turned off and to stop dispensing chemical to the flowing fluid. At time T=85 minutes the fluid inflow is decreased to approximately 18 $m^3$/second of fluid flowing into the cutthroat flume. This fluid flow results in a fluid depth in the cutthroat flume of approximately 13 cm and causes the third tube to be turned off and to stop dispensing chemical to the flowing fluid. At time T=95 minutes the fluid inflow is decreased to approximately 9 $m^3$/second of fluid flowing into the cutthroat flume. This fluid flow results in a fluid depth in the cutthroat flume of approximately 9.3 cm and causes the second tube to be turned off and to stop dispensing chemical to the flowing fluid. As can be seen from FIG. 8, the tubes are staged in a serial manner with rising fluid depth at predetermined intervals: tube one first, then the second tube is added and then the third tube and then the fourth tube. As the fluid inflow decreases, and with the accompanying falling fluid depths, the fourth tube is turned off, then the third tube, and then the second tube. All the while, a constant uniform outflow chemical concentration of approximately 5.4 mg/l is maintained.

Figure 9:
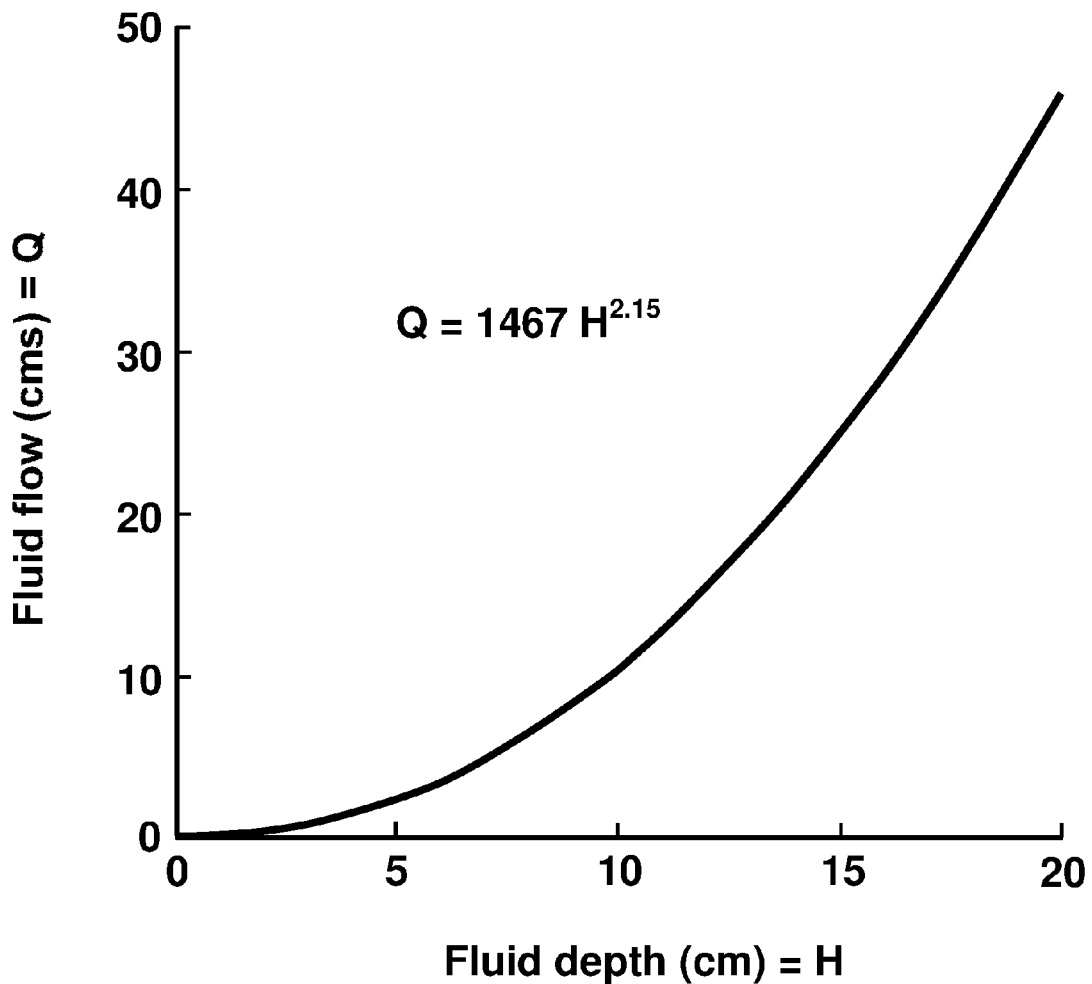
FIG. 9 is a graph illustrating the stage-discharge relationship of a 45 cm×20 cm cutthroat flume.

FIG. 9 is a graph illustrating the stage-discharge relationship for a cutthroat flume which is the preferred open-channel fluid-flow device for the applicants' invention. As can be easily seen from FIG. 9, the fluid flow Q [discharge] through a 45 cm×20 cm cutthroat flume is equal to 1467 $H^{2.15}$ where H is the fluid depth [stage] in the cutthroat flume. This is clearly non-linear flow. When the fluid depth [stage] in the flume doubles from 5 cm to 10 cm, the fluid flow [discharge] increases from approximately 2.5 $m^3$/second for a stage of 5 cm to approximately 11 5 $m^3$/second for a stage of 10 cm. Or for a doubled depth [stage] the fluid flow [discharge] increased by a factor of more than 4. This clearly illustrates the non-linear stage-discharge relationship for a cutthroat flume.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

The invention claimed is:

1. An apparatus for treating flowing fluids, which may have widely varying flow rates, with a regulated, uniform dosing of at least one chemical comprising:
   an open-channel fluid-flow control device positioned at a first level,
   said open-channel fluid-flow control device having first and second sides, a mouth and a discharge end,
   a gravity powered dispensing system for dispensing chemicals into fluid flowing through said fluid-flow control device, said dispensing system further comprising:
   a chemical reservoir, positioned at a second level higher than said first level, said dispensing system further comprising at least two tubes for dispensing chemicals from said reservoir into fluid flowing through said fluid-flow control device,
   each of said at least two tubes being positioned at a third level between said first and second levels,
   each of said at least two tubes being connected to said chemical reservoir such that chemical from said reservoir may flow by gravity to each of said at least two tubes of said dispensing system,
   each of said at least two tubes further comprising an on-off switch mounted in each said tube,
      each said on-off switch being positioned in each of said at least two tubes and further comprising an independent means to turn each said on-off switch on and permit the flow of chemical through each of said at least two tubes or to turn each said on-off switch off and block the flow of chemical through each of said at least two tubes, with said independent means being capable of turning each said on-off switch on or off independently of any other on-off switch,
      each said independent means further comprising a means in hydraulic communication with said open-channel fluid-flow control device for sensing the fluid level in said open-channel fluid-flow control device and for turning said on-off switch on or off in response to a predetermined, sensed, fluid level in said open-channel fluid-flow control device, wherein the means in hydraulic communication with said open-channel fluid-flow control device associated with said first tube is arranged to actuate the on-off switch for said first tube at a first, predetermined, sensed, fluid level and wherein the means in hydraulic communication with said open-channel fluid-flow control device associated with the second of said at least two tubes is arranged to actuate the on-off switch for the second of said at least two tubes at a second, predetermined, sensed, fluid level and wherein said first fluid level is less than said second fluid level.

2. The apparatus of claim 1 further comprising at least one stilling well mounted adjacent one side of said open-channel fluid-flow control device and in hydraulic communication with said open-channel fluid-flow control device.

3. The apparatus of claim 2 wherein each said means in hydraulic communication with said open-channel fluid-flow control device is mounted in said stilling well.

4. The apparatus of claim 2 wherein there are two stilling wells, with a first stilling well mounted on one side of said open-channel fluid-flow control device and a second stilling well mounted on the other side of said open-channel fluid-flow control device with each said stilling well being in hydraulic communication with said open-channel fluid-flow control device.

5. The apparatus of claim 4 wherein there are at least four tubes for dispensing chemicals from said reservoir.

6. The apparatus of claim 4 wherein there are at least four tubes for dispensing chemicals from said reservoir and the first two of said at least four tubes are mounted over said first stilling well and the second two of said at least four tubes are mounted over said second stilling well such that chemical dispensed from said at least four tubes will fall into fluid flowing through said open-channel fluid flow device.

7. The apparatus of claim 6 wherein said means in hydraulic communication with said open-channel fluid-flow control device associated with the first two of said at least four tubes is mounted within said first stilling well and wherein said means in hydraulic communication with said open-channel fluid-flow control device associated with the second two of said at least four tubes is mounted within said second stilling well.

8. The apparatus of claim 7 wherein each said means in hydraulic communication with said open-channel fluid-flow control device further comprises a float and an extension rod connected to said float and said on-off switch such that vertical motion of said float and said extension rod will turn the on-off switch on or off.

9. The apparatus of claim 8 wherein the float and extension rod for the first of said at least four tubes is mounted at a first predetermined height in said first stilling well such that said float and extension rod for the first of said at least four tubes may move upward from said first predetermined height but may not move downward from said first predetermined height and wherein the float and extension rod for the second of said at least four tubes is mounted at a second predetermined height in said first stilling well such that said float and extension rod for the second of said at least four tubes may move upwards from said second predetermined height but may not move downwards from said second predetermined height with said second predetermined height being greater than said first predetermined height.

10. The apparatus of claim 9 wherein the float and extension rod for the third of said at least four tubes is mounted at a third predetermined height in said second stilling well such that said float and extension rod for the third of said at least four tubes may move upward from said third predetermined height but may not move downward from said third predetermined height and wherein the float and extension rod for the fourth of said at least four tubes is mounted at a fourth predetermined height in said second stilling well such that said float and extension rod for the fourth of said at least four tubes may move upward from said fourth predetermined height but may not move downward from said fourth predetermined height and with said third predetermined height being less than said fourth predetermined height.

11. The apparatus of claim 10 wherein said third and fourth predetermined heights are greater than said first and second predetermined heights such that with a rising fluid level in said open-channel fluid-flow control device each of said at least four tubes will be turned on in sequence and in accordance with said predetermined heights.

12. The apparatus of claim 1 wherein said open-channel fluid-flow control device comprises a cutthroat flume.

13. The apparatus of claim 1 wherein a mixing structure is attached to the discharge end of said open-channel fluid-flow control device to create turbulence in fluid flowing through said open-channel fluid-flow control device wherein said mixing structure aids in mixing the chemical dispensed by said dispensing system.

14. A method for dosing flowing fluids which may have widely varying flow rates with a regulated, uniform dosing of at least one chemical comprising:
   passing the flowing fluids through an open-channel fluid-flow control device with a known, non-linear, stage-discharge relationship,
   providing a chemical-dispensing system for dispensing chemicals into fluids flowing through said open-channel fluid-flow control device with said chemical-dispensing system having at least two tubes for dispensing chemicals into fluid flowing through said fluid-flow control device, and measuring the fluid level in said fluid-flow control device to determine the discharge of fluid passing through said fluid-flow control device using the known stage-discharge relationship of said fluid-flow control device and when said fluid level has reached a first predetermined value, actuating one of said at least two tubes for dispensing a predetermined first amount of chemical into the fluid flowing through said fluid-flow control device and when said fluid level has reached a second predetermined value, greater than said first predetermined value, actuating another one of said at least two tubes for dispensing a predetermined second amount of chemical into the fluid flowing through said fluid-flow control device, wherein a regulated, uniform dosing of chemical is achieved in the fluid discharged from said open-channel fluid-flow control device.

15. The method of claim 14 wherein said chemical-dispensing system has at least four tubes for dispensing chemicals into fluid flowing through said fluid-flow control device and wherein said measuring step further comprises, when said fluid level in said fluid-flow control device has reached a third predetermined value, greater than said second predetermined value, actuating the third of said at least four tubes for dispensing a predetermined third amount of chemical into the fluid flowing through said fluid-flow control device and when said fluid level has reached a fourth predetermined value, greater than said third predetermined value, actuating the fourth of said at least four tubes for dispensing a predetermined fourth amount of chemical into the fluid flowing through said fluid-flow control device.

16. The method of claim 15 including the step of providing a mixing structure downstream of the discharge end of said fluid-flow control device in order to provide more uniform mixing of the chemical added to the fluid flowing through said fluid-flow control device.

17. An apparatus for treating flowing fluids, which may have widely varying flow rates, with a regulated, uniform dosing of at least one chemical comprising:

an open-channel fluid-flow control device positioned at a first level, said open-channel fluid-flow control device having a known, non-linear, stage-discharge relationship, said open-channel fluid-flow control device having first and second sides, a mouth and a discharge end, a gravity powered dispensing system for dispensing at least one chemical into fluid flowing through said open-channel fluid-flow control device, said dispensing system further comprising:

a chemical reservoir, positioned at a second level higher than said first level, said dispensing system further comprising at least two tubes for dispensing chemicals from said reservoir into fluid flowing through said open-channel fluid-flow control device, each of said at least two tubes being positioned at a third level between said first and second levels, each of said at least two tubes being connected to said chemical reservoir such that chemical from said reservoir may flow by gravity to each of said at least two tubes of said dispensing system, each of said at least two tubes further comprising an on-off switch mounted in each said tube, each said on-off switch being positioned in each of said at least two tubes and further comprising an independent means to turn each said on-off switch on and permit the flow of chemical through each of said at least two tubes or to turn each said on-off switch off and block the flow of chemical through each of said at least two tubes, with said independent means being capable of turning each said on-off switch on or off independently of any other on-off switch, each said independent means further comprising a means in hydraulic communication with said open-channel fluid-flow control device for sensing the fluid level in said open-channel fluid-flow control device and for turning said on-off switch on or off in response to a predetermined, sensed, fluid level in said open-channel fluid-flow control device, wherein the means in hydraulic communication with said fluid-flow control device associated with said first tube is arranged to actuate the on-off switch for said first tube at a first, predetermined, sensed, fluid level and wherein the means in hydraulic communication with said fluid-flow control device associated with the second of said at least two tubes is arranged to actuate the on-off switch for the second of said at least two tubes at a second, predetermined, sensed, fluid level and wherein said first fluid level is less than said second fluid level.

18. The apparatus of claim 1 wherein each of said at least two tubes further comprise a tube flow control device mounted downstream from said on-off switch to regulate the amount of chemical flowing through each said tube per unit of time once each of said at least two tubes is turned on by said on-off switch.

19. The apparatus of claim 18 wherein each of said at least two tubes further comprise a discharge end for discharging chemical into fluid flowing through said open-channel fluid-flow control device, and wherein said discharge end is downstream of said tube flow control device.

* * * * *